US012450480B2

(12) United States Patent
Leal et al.

(10) Patent No.: US 12,450,480 B2
(45) Date of Patent: Oct. 21, 2025

(54) SELF-ADAPTIVE DISTILLATION

(71) Applicant: Google LLC, Mountain View, CA (US)

(72) Inventors: Isabel Leal, Mountain View, CA (US);
Neeraj Gaur, Mountain View, CA
(US); Parisa Haghani, Mountain View,
CA (US); Brian Farris, Mountain
View, CA (US); Bhuvana
Ramabhadran, Mt. Kisco, NY (US);
Manasa Prasad, Mountain View, CA
(US); Pedro J. Moreno Mengibar,
Jersey City, NJ (US); Yun Zhu,
Mountain View, CA (US)

(73) Assignee: Google LLC, Mountain View, CA (US)

( * ) Notice: Subject to any disclaimer, the term of this patent is extended or adjusted under 35 U.S.C. 154(b) by 988 days.

(21) Appl. No.: 17/544,570

(22) Filed: Dec. 7, 2021

(65) Prior Publication Data
US 2022/0309340 A1 Sep. 29, 2022

Related U.S. Application Data

(60) Provisional application No. 63/166,938, filed on Mar. 26, 2021.

(51) Int. Cl.
G06N 3/08 (2023.01)
G06N 3/045 (2023.01)
G10L 15/06 (2013.01)

(52) U.S. Cl.
CPC ............. G06N 3/08 (2013.01); G06N 3/045 (2023.01); G10L 15/063 (2013.01)

(58) Field of Classification Search
CPC .......... G06N 3/08; G06N 3/045; G06N 3/084; G06N 3/45; G10L 15/063; G10L 15/16; G10L 13/043; G10L 13/08
See application file for complete search history.

(56) References Cited

U.S. PATENT DOCUMENTS

2020/0387782 A1* 12/2020 Hegde .................... G06N 3/082
2022/0199258 A1* 6/2022 Yoo ........................ G16H 50/20
2022/0343175 A1* 10/2022 Lu .......................... G06N 3/088

FOREIGN PATENT DOCUMENTS

JP 2020537765 A 12/2020
WO 2020242580 A1 12/2020

OTHER PUBLICATIONS

Xu et al., Knowledge Distillation from Multilingual and Monolingual Teachers from End-to-End Multilingual Speech Recognition, Proceedings of APSIPA Annual Summit and Conference 2019, Nov. 18-21, 2019 (Year: 2019).*

(Continued)

Primary Examiner — Linda Wong
(74) Attorney, Agent, or Firm — Honigman LLP; Brett A. Krueger; Grant Griffith

(57) ABSTRACT

A method for distilling one or more trained teacher automatic speech recognition (ASR) models into a multilingual student model includes receiving a plurality of teacher training examples and a plurality of student training examples. The method also includes training one or more teacher automatic speech recognition (ASR) models using the plurality of teacher training examples. Each teacher ASR model is configured to output a respective textual representation of a respective audio input. The method further includes generating a multi-lingual student ASR model by training the multi-lingual student ASR model using the plurality of student training examples and distilling the trained one or more teacher ASR models into the multilingual student ASR model using a tunable distillation loss weight. Each student ASR model is configured to receive an audio input and output a corresponding textual representation of the received audio input.

12 Claims, 7 Drawing Sheets

(56) References Cited

OTHER PUBLICATIONS

Wang et al., Structure-Level Knowledge Distillation for Multilingual Sequence Labeling, https://arxiv.org/abs/2004.03846, May 4, 2020 (Year: 2020).*

Mar. 28, 2022 Written Opinion (WO) of the International Searching Authority (ISA) and International Search Report (ISR) issued in International Application No. PCT/US2021/062255.

Xu Jingyi et al: "Knowledge Distillation from Multilingual and Monolingual Teachers 9-13,19, for End-to-End Multilingual Speech Recognition", 2019 Asia-Pacific Signal and Information Processing Association Annual Summit and Conference (APSIPA ASC), IEEE, Nov. 18, 2019 (Nov. 18, 2019), pp. 844-849, XP033733114.

Hayato Futami et al: "Distilling the Knowledge of BERT for Sequence-to-Sequence ASR", arxiv.org, Cornell University Library, 201 Olin Library Cornell University Ithaca, NY 14853, Aug. 9, 2020 (Aug. 9, 2020), XP081737409.

Kinyu Wang et al: "Structure-Level Knowledge Distillation For Multilingual Sequence Labeling", arxiv.org, Cornell University Library, 201 Olin Library Cornell University Ithaca, NY 14853, Apr. 8, 2020 (Apr. 8, 2020), XP081656606.

Kevin Clark et al: "BAM1 Born-Again Multi-Task Networks for Natural Language Understanding", arxiv.org, Cornell University Library, 201 Olin Library Cornell University Ithaca, NY 14853, Jul. 10, 2019 (Jul. 10, 2019), XP081440483.

Xinyu Wang et al: "Structural Knowledge Distillation", arxiv.org, Cornell University Library, 201 Olin Library Cornell University Ithaca, NY 14853, Oct. 10, 2020 (Oct. 10, 2020), XP081783511.

Han Zhu et al: "Domain Adaptation Using Class Similarity for Robust Speech Recognition", arxiv.org, Cornell University Library, 201 Olin Library Cornell University Ithaca, NY 14853, Nov. 5, 2020 (Nov. 5, 2020), XP081796777.

Leal Isabel et al: "Self-Adaptive Distillation for Multilingual Speech Recognition: Leveraging Student Independence", INTERSPEECH 2021, Aug. 30, 2021 (Aug. 30, 2021), pp. 2556-2560, XP055898227.

Office Action issued in related Japanese Patent Application No. 2023-558805, dated Nov. 19, 2024.

* cited by examiner

SELF-ADAPTIVE DISTILLATION

CROSS REFERENCE TO RELATED APPLICATIONS

This U.S. patent application claims priority under 35 U.S.C. § 119(e) to U.S. Provisional Application 63/166,938, filed on Mar. 26, 2021. The disclosure of this prior application is considered part of the disclosure of this application and is hereby incorporated by reference in its entirety.

TECHNICAL FIELD

This disclosure relates to self-adaptive distillation.

BACKGROUND

As automatic speech recognition (ASR) has gained popularity in recent years, ASR is being more broadly applied to languages around the world. Unfortunately, some of these languages have limitations that affect the quality or robustness of an ASR model. For instance, languages may range from having high resources to low resources where these resources refer to resources that ASR models leverage to train and to improve accuracy and robustness. With resource disparity, the ASR models may encounter varying degrees of performance degradation that inevitably impact a user's experience with applications or programs that employ ASR models.

SUMMARY

One aspect of the disclosure provides a computer-implemented method for distilling one or more trained teacher automatic speech recognition (ASR) models into a multi-lingual student model. The computer-implemented method when executed on data processing hardware causes the data processing hardware to perform operations receiving a plurality of teacher training examples and a plurality of student training examples. The operations also include training one or more teacher ASR models using the plurality of teacher training examples. Each teacher ASR model is configured to output a respective textual representation of a respective audio input. The operations also include generating a multi-lingual student ASR model by training the multi-lingual student ASR model using the plurality of student training examples and distilling the trained one or more teacher ASR models into the multilingual student ASR model using a tunable distillation loss weight. Each student ASR model is configured to receive an audio input and output a corresponding textual representation of the received audio input.

Implementations of the disclosure may include one or more of the following optional features. In some implementations, the one or more teacher ASR models are configured to collectively recognize fewer languages than the multilingual student ASR model. The tunable distillation loss weight may include a constant value. In some additional implementations, training the multi-lingual student model occurs across n number of training steps and the tunable distillation loss weight includes a decreasing function decreasing based on the n number of training steps.

In some examples, each of the one or more teacher ASR models and the multi-lingual student ASR models include a recurrent neural network-transducer (RNN-T) architecture. In these examples, the tunable distillation loss weight may include a decreasing function based on an RNN-T loss corresponding to the one or more teacher ASR models. Alternatively, the tunable distillation loss weight in these examples may include a decreasing function based on a first RNN-T loss corresponding to the one or more teacher ASR models and a second RNN-T loss corresponding to the multi-lingual student ASR model. Here, the decreasing function may decrease the first RNN-T loss corresponding to the one or more teacher ASR models over an instance of time and increase the second RNN-T loss corresponding to the multi-lingual student ASR model over the instance of time.

Each teacher ASR model of the one or more teacher ASR models may correspond to a mono-lingual ASR model. Alternatively, the one or more teacher ASR models may correspond to a single multi-lingual ASR model.

Another aspect of the disclosure provides a system for distilling one or more trained teacher automatic speech recognition (ASR) models into a multilingual student model. The system includes data processing hardware and memory hardware in communication with the data processing hardware. The memory hardware stores instructions that when executed on the data processing hardware causes the data processing hardware to perform operations including receiving a plurality of teacher training examples and a plurality of student training examples. The operations also include training one or more teacher ASR models using the plurality of teacher training examples. Each teacher ASR model is configured to output a respective textual representation of a respective audio input. The operations also include generating a multi-lingual student ASR model by training the multi-lingual student ASR model using the plurality of student training examples and distilling the trained one or more teacher ASR models into the multilingual student ASR model using a tunable distillation loss weight. Each student ASR model is configured to receive an audio input and output a corresponding textual representation of the received audio input.

This aspect may include one or more of the following optional features. In some implementations, the one or more teacher ASR models are configured to collectively recognize fewer languages than the multi-lingual student ASR model. The tunable distillation loss weight may include a constant value. In some additional implementations, training the multi-lingual student model occurs across n number of training steps and the tunable distillation loss weight includes a decreasing function decreasing based on the n number of training steps.

In some examples, each of the one or more teacher ASR models and the multi-lingual student ASR models include a recurrent neural network-transducer (RNN-T) architecture. In these examples, the tunable distillation loss weight may include a decreasing function based on an RNN-T loss corresponding to the one or more teacher ASR models. Alternatively, the tunable distillation loss weight in these examples may include a decreasing function based on a first RNN-T loss corresponding to the one or more teacher ASR models and a second RNN-T loss corresponding to the multi-lingual student ASR model. Here, the decreasing function may decrease the first RNN-T loss corresponding to the one or more teacher ASR models over an instance of time and increase the second RNN-T loss corresponding to the multi-lingual student ASR model over the instance of time.

Each teacher ASR model of the one or more teacher ASR models may correspond to a mono-lingual ASR model. Alternatively, the one or more teacher ASR models may correspond to a single multi-lingual ASR model.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1A:
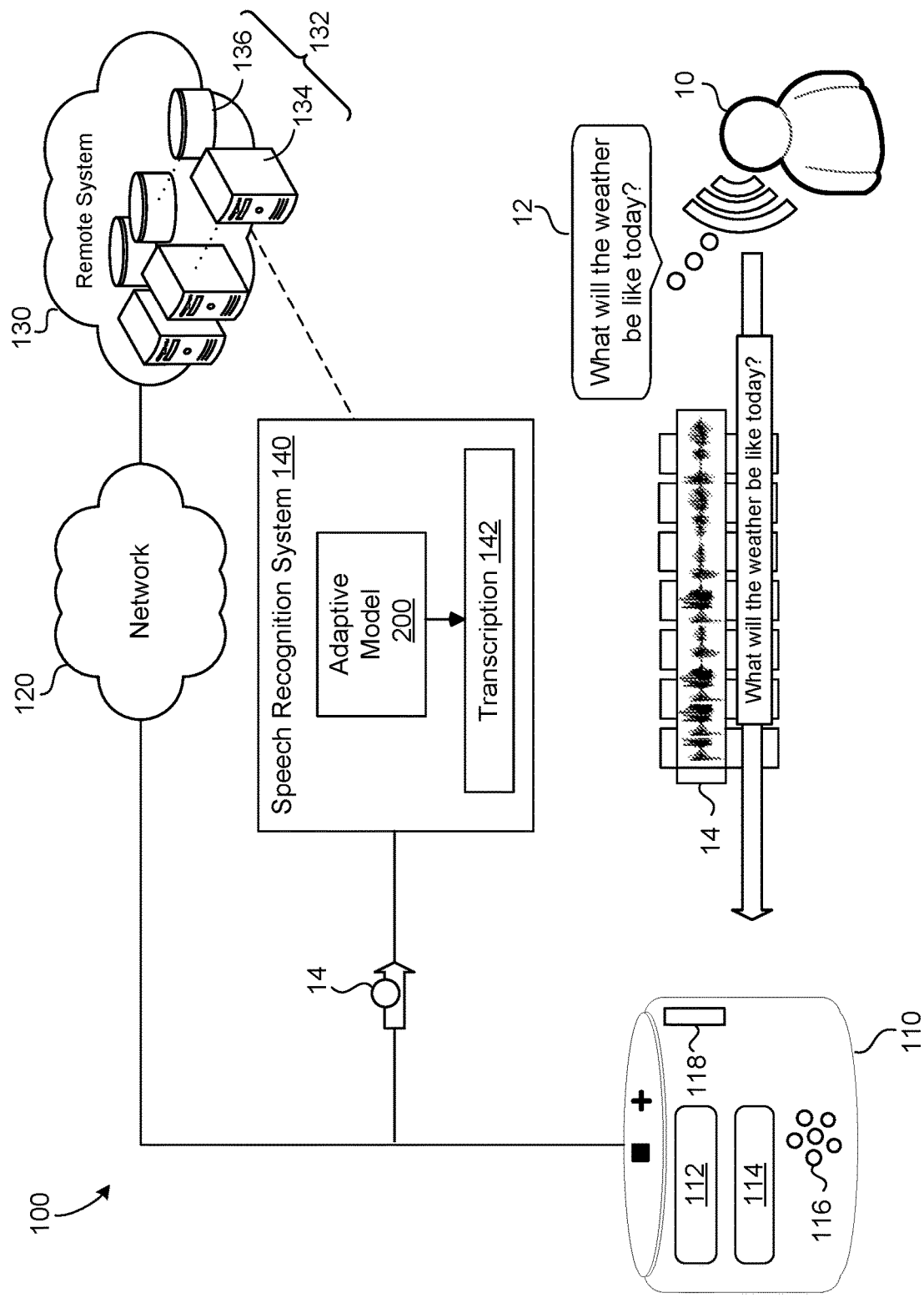
FIGS. 1A and 1B are schematic views of example speech environments using an adaptive automatic speech recognition model.
Figure 1B:
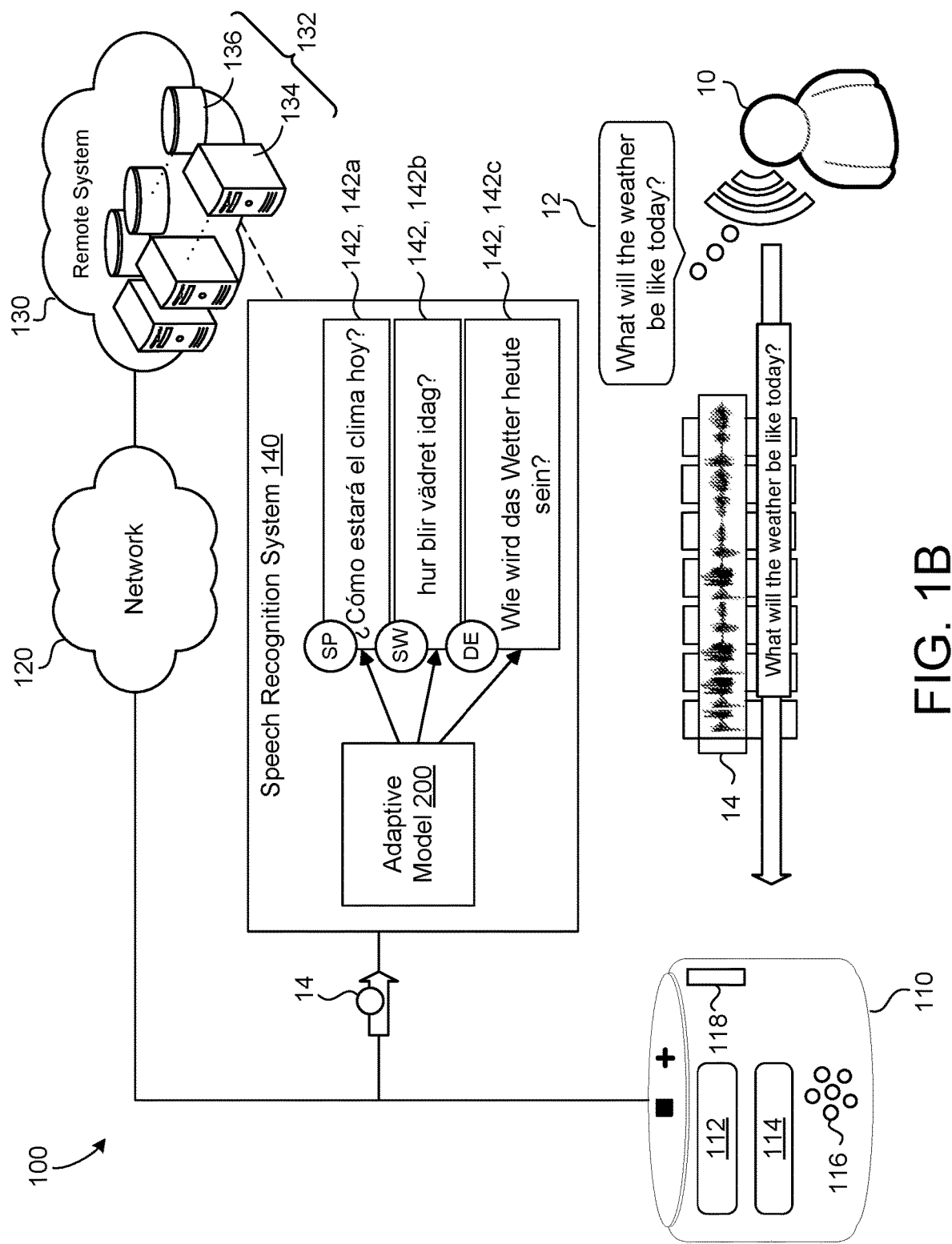

Referring to FIGS. 1A and 1B, in some implementations, a speech environment 100 includes a user 10 communicating a spoken utterance 12 to a speech-enabled device 110 (also referred to as a device 110 or a user device 110). The user 10 (i.e., speaker of the utterance 12) may speak the utterance 12 as a query or a command to solicit a response from the device 110 or to have the device 110 execute a task specified by the query. The device 110 is configured to capture sounds from one or more users 10 within the speech environment 100. Here, the audio sounds may refer to a spoken utterance 12 by the user 10 that functions as an audible query, a command for the device 110, or an audible communication captured by the device 110. Speech-enabled systems of the device 110 or associated with the device 110 (e.g., a digital assistant interface) may field the query for the command by answering the query and/or causing the command to be performed.

Here, the device 110 captures audio data 14 corresponding to the spoken utterance 12 by the user 10. The device 110 may correspond to any computing device associated with the user 10 and capable of receiving audio data 14. Some examples of user devices 110 include, but are not limited to, mobile devices (e.g., mobile phones, tablets, laptops, e-book readers, etc.), computers, wearable devices (e.g., smart watches), music player, casting devices, smart appliances (e.g., smart televisions) and internet of things (IoT) devices, remote controls, smart speakers, etc. The device 110 includes data processing hardware 112 and memory hardware 114 in communication with the data processing hardware 112 and storing instructions, that when executed by the data processing hardware 112, cause the data processing hardware 112 to perform one or more operations related to speech and/or text processing. In some examples, the device 110 includes one or more applications (i.e., software applications) where each application may utilize one or more speech processing systems 140, 200 associated with device 110 to perform various functions within the application.

The device 110 further includes an audio subsystem with an audio capturing device (e.g., a microphone) 116 for capturing and converting audio data 14 within the speech environment 100 into electrical signals and a speech output device (e.g., a speaker) 118 for communicating an audible audio signal (e.g., a synthesized playback signal 154 from the device 110). While the device 110 implements a single audio capturing device 116 in the example shown, the device 110 may implement an array of audio capturing devices 116 without departing from the scope of the present disclosure, whereby one or more audio capturing devices 116 in the array may not physically reside on the device 110, but be in communication with the audio subsystem (e.g., peripherals of the device 110). For example, the device 110 may correspond to a vehicle infotainment system that leverages an array of microphones positioned throughout the vehicle.

Furthermore, the device 110 is configured to communicate via a network 120 with a remote system 130. The remote system 130 may include remote resources 132, such as remote data processing hardware 134 (e.g., remote servers or CPUs) and/or remote memory hardware 136 (e.g., remote databases or other storage hardware). The device 110 may utilize the remote resources 132 to perform various functionality related to speech processing. For instance, the device 110 is configured to perform speech recognition using a speech recognition system 140. These systems 140, 200 may reside on the device 110 (referred to as on-device systems) or reside remotely (e.g., reside on the remote system 130), but in communication with the device 110. In some examples, some of these systems 140, 200 reside locally or on-device while others reside remotely. In other words, any of these systems 140, 200 may be local or remote in any combination. For instance, when a system 140, 200 is rather large in size or processing requirements, the system 140, 200 may reside in the remote system 130. Yet when the device 110 may support the size or the processing requirements of one or more systems 140, 200, the one or more systems 140, 200 may reside on the device 110 using the data processing hardware 112 and/or the memory hardware 114. Optionally, the one or more of the systems 140, 200 may reside on both locally/on-device and remotely. For instance, one or more of the systems 140, 200 may default to execute on the remote system 130 when a connection to the network 120 between the device 110 and remote system 130 is available, but when the connection is lost or the network 120 is unavailable, the systems 140, 200 instead execute locally on the device 110.

A speech recognition system 140 receives audio data 14 as an input and transcribes that audio signal into a transcription 142 as an output using an adaptive automatic speech recognition (ASR) model 200 (also referred to as the adaptive model 200). Generally speaking, by converting the audio data 14 into a transcription 142, the speech recognition system 140 allows the device 110 to recognize when a spoken utterance 12 from the user 10 corresponds to a query, a command, or some other form of audio communication. The transcription 142 refers to a sequence of text that the device 110 may then use to generate a response to the query or the command. For instance, if the user 10 asks the device 110 the question of "what will the weather be like today," the device 110 passes the audio data 14 corresponding to the question "what will the weather be like today" to the speech recognition system 140. The speech recognized system 140 converts the audio data 14 into a transcript that includes the text of "what will the weather be like today?" The device 110 may then determine a response to the query using the text or portions of the text. For instance, in order to determine the weather for the current day (i.e., today), the device 110 passes the text (e.g., "what will the weather be like today?")

or identifying portions of the text (e.g., "weather" and "today") to a search engine. The search engine may then return one or more search results that the device 110 interprets to generate a response for the user 10.

Referring to FIG. 1B, the adaptive model 200 of the speech recognition system 140 may be a multi-lingual speech recognition model. A multi-lingual speech recognition model is a model that is capable of generating transcriptions 142 in more than one language (i.e., multiple languages). For example, FIG. 1B illustrates the speech recognition system 140 receives the audio data 14 and the multi-lingual version of the adaptive model 200 converting the audio data 14 corresponding to the utterance 12 of "what will the weather be like today?" into three different transcriptions 142, 142*a-c*. Here, a first transcription 142*a* is a Spanish (designated SP) translation of "what will the weather be like today?" or "¿Cómo estará el clima hoy?" The second transcription 142*b* is a Swedish (designated SW) translation of "what will the weather be like today?" or "hur blir vädret idag?" The third transcription 142*c* is a German (designated DE) translation of "what will the weather be like today?" or "Wie wird das Wetter heute sein?" Multi-lingual speech recognition models may be advantageous to multi-lingual users who can speak different languages or to improve the performance of speech recognition models for low-resource languages by learning shared representations from data available from other languages (i.e., high resource languages). For instance, there may be a large number of training data for a language like US English, but yet a small amount of training data for a language like Zulu. Here, the when the adaptive model 200 is a multi-lingual model, the adaptive model 200 can leverage large amounts of US English training examples to compensate for the deficiency of training data for Zulu.

Figure 2A:
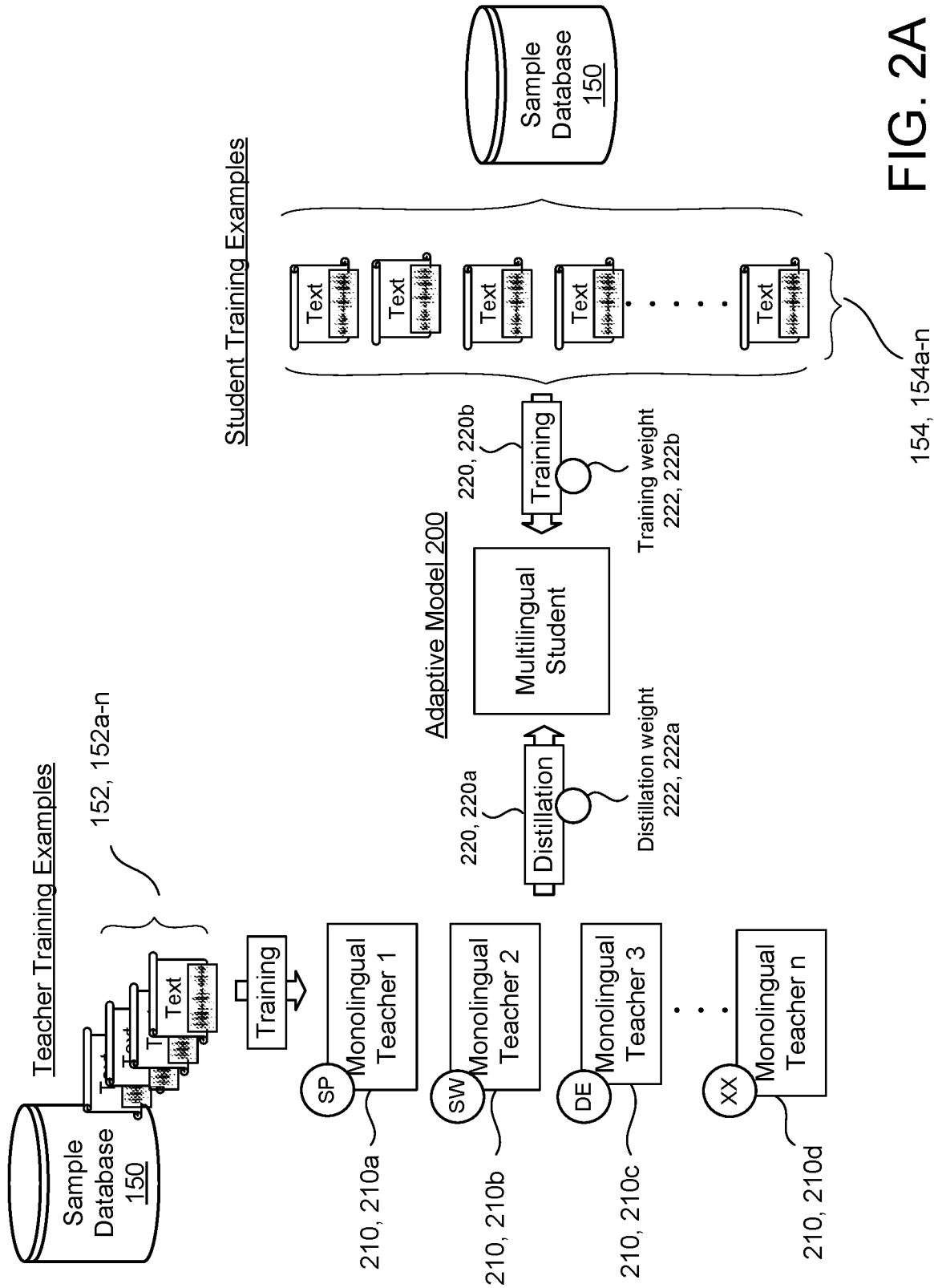
FIG. 2A is a schematic view of an example adaptive model formed from more than one monolingual teacher model.
Figure 2B:
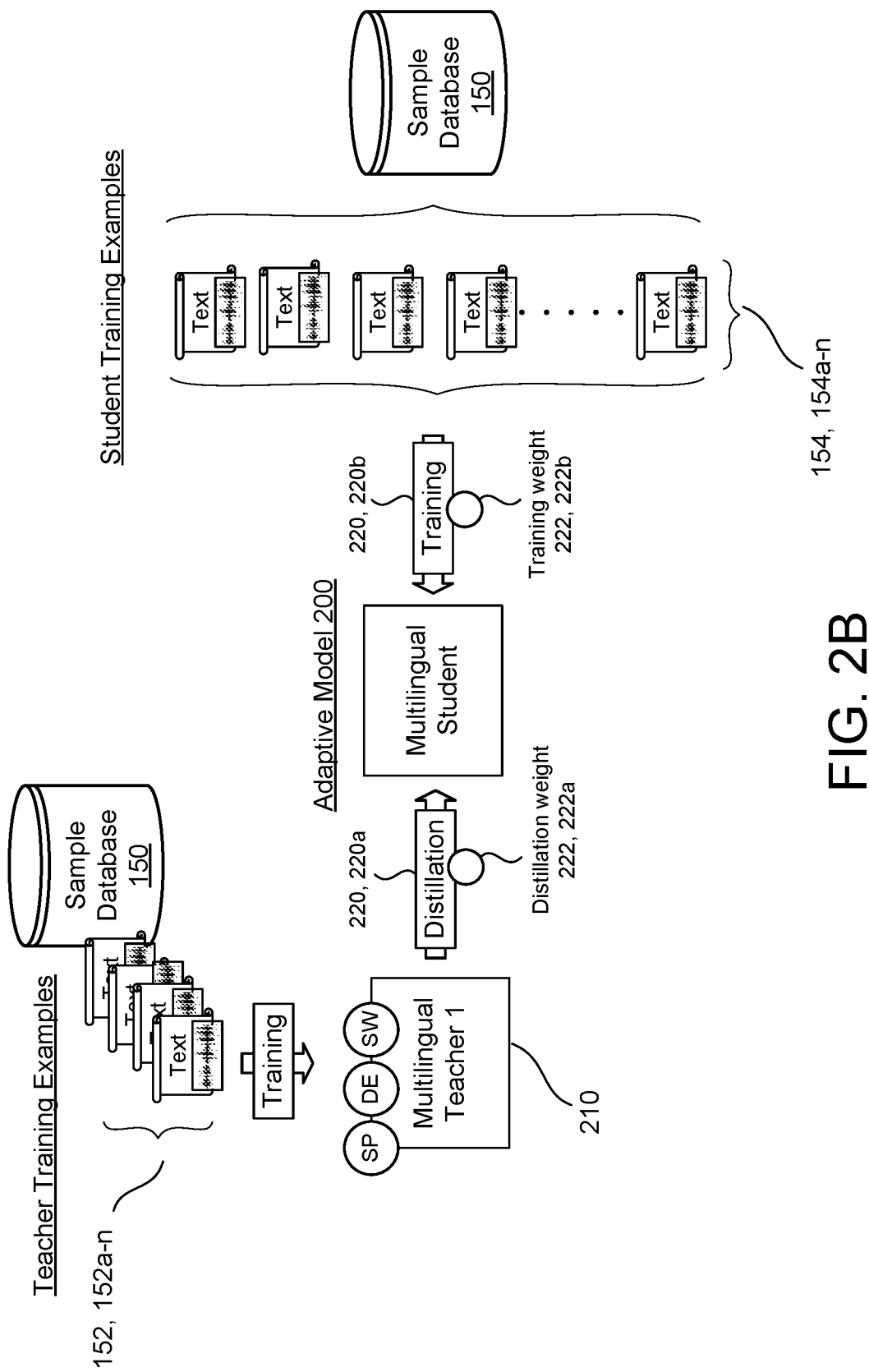
FIG. 2B is a schematic view of an example adaptive model formed from a single multilingual teacher model.

FIGS. 2A and 2B are examples of the process of generating the adaptive model 200 (also referred to as a student model 200). The adaptive model 200 may be formed from one or more teacher models 210 such that the adaptive model 200 is what may be referred to as a student model. That is, the teacher model 210 has a neural network that is distilled into a student model (e.g., the adaptive model 200) to form the neural network of the student model or in some way impact it. Distillation generally refers to a process of training a neural network using a pre-trained network. Using distillation, neurons of the pre-trained network that are less critical to a desired output (e.g., similar to deadweight) may be reduced to form a more streamlined neural network (i.e., the distilled neural network). Distillation may enable the distilled neural network to be more accurate and/or a more compact size when compared to the pre-trained network. In other words, when the pre-trained network was formed, the pre-trained network may have formed neurons that ultimately resulted in having less impact on the desired output by the time the training of the pre-trained network was complete; therefore, the pre-trained network includes neurons that may be removed or modified to reduce any detrimental impact from these neurons or to remove unnecessary neurons. For an ASR model, distillation may be advantageous in low resource situations where the student model may learn to behave in a low resource situation from a teacher model that has learned from a high resource situation.

Yet distillation is not without its challenges when transferring knowledge to a student model 200. For instance, one difficulty when performing knowledge distillation for the student model 200 is how to balance between learning processes 220. That is, the student model 200 may be taught by both a distillation process 220, 220*a* and its own training process 220, 220*b*. Because multiple learning processes 220 are involved to generate the student model 200, the performance of the trained student model 200 may change based on the balance between these processes 220. During the learning processes 220, the one or more teacher models 210 are first trained to establish a neural network for the distillation process 220*a*. During the training process for the one or more teacher models 210, the teacher model(s) 210 receives a plurality of teacher training samples 152, 152*a-n* (e.g., from a training sample database 150) and train using the teacher training samples 152 to teach each teacher model 210 to predict, as an output, a textural representation of a respective audio input. In this respect, training samples (e.g., the teacher training samples 152 or the student training examples 154) allow a model to learn a ground truth because the training samples 152, 154 include an audio sample and a corresponding transcription (i.e., textual representation) of the audio sample. Once the one or more teacher models 210 are trained, the one or more trained teacher models 210 may then distill their knowledge to the student model 200.

In addition to the distillation process 220*a* from the one or more teacher models 210, the student model 200 also learns from a training process 220, 220*b*. In the training process 220*b*, much like the teacher training process, the student model 200 learns from student training samples 154 to predict a textual representation for an audio input. With both the distillation process 220*a* and the training process 220*b*, the student model 200 is configured to balance how much knowledge it imparts from these processes 220*a*, 220*b* by using weights 222, 222*a-b*. That is, each process 220*a*, 220*b* is a sequence of training steps. At each training step, the loss for each process 220 is computed and used to impact the next training step. For example, generally speaking, the student model 200 would like to minimize the loss for a given process 220 to approach a neural network that can accurately predict the textual representation for a given input audio. Because each process 220 has an accompanying loss, the overall learning process may be represented by a total loss as a combination of the distillation loss for the distillation process 220*a* and the training loss (e.g., an RNN-T loss) for the training process 220*b*. Therefore, to dictate how the student model 200 balances these processes 220*a*, 220*b*, the student model 200 uses a tunable weight 222 applied to either process loss. In some examples, the tunable weight 222 is applied to the distillation loss and is therefore referred to as a tunable distillation weight 222*a*.

In some configurations, the tunable distillation weight 222*a* is configured as a constant value. But in other configurations, the tunable distillation weight 222*a* may be a decreasing function that decreases as a number of training steps increases. That is, the student model 200 becomes less concerned about the distillation process loss over time. When the one or more teacher models 210 and the student model 200 have RNN-T model architecture (e.g., in end-to-end streaming applications), the tunable distillation weight 222*a* may be a decreasing function based on an RNN-T loss corresponding to one or more teacher models 210. Additionally, with RNN-T architecture for both models 200, 210, the tunable distillation weight 222*a* may also account for the RNN-T loss of the student model 200. Here, the tunable distillation weight 222*a* may account for the RNN-T loss of the student model 200 by being a function that decreases based on a first RNN-T loss from the one or more teacher models 210, while increasing based on a second RNN-T loss from the student model 200.

Referring specifically to FIG. 2A, the one or more teacher models 210 may correspond to multiple mono-lingual teacher models 210 that distill each of their knowledge to the student model 200 to form a multi-lingual student model 200. In contrast, FIG. 2B depicts the one or more teacher models 210 as a single multi-lingual teacher model 210 that distills its knowledge to a multi-lingual student model 200. In either of these cases, the one or more teacher models 210 may collectively recognize fewer languages than the resulting multi-lingual student model 200. For instance, with the student model 200 having its own training process 220a, the student model 200 is able to expand its language base to include more languages than the teacher models 210 distilled to the student model 200.

Figure 3:
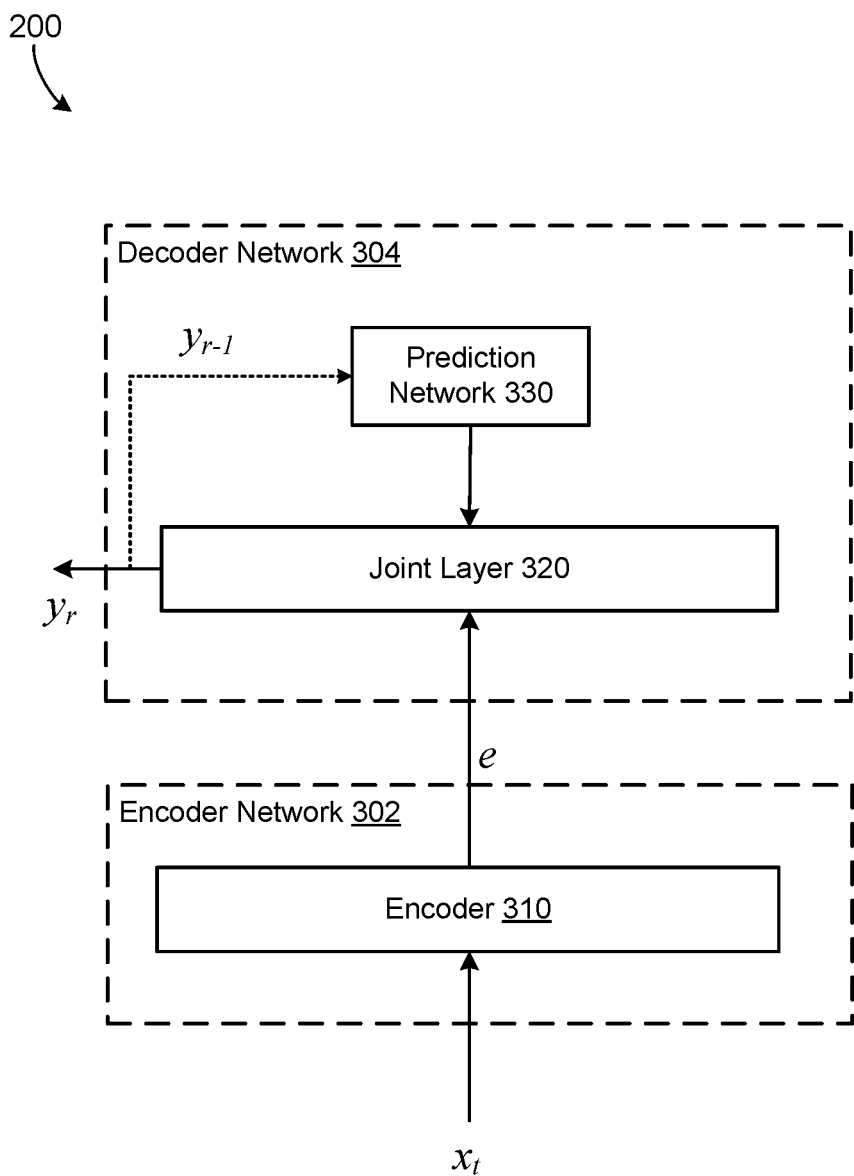
FIG. 3 is a schematic view of an example model architecture for the adaptive model of FIGS. 1A-2B.

Referring to FIG. 3, the process of adaptive distillation may be applicable to different types of speech recognition models. Generally speaking, when the adaptive model 200 is a particular type of speech recognition model, both the teacher model 210 and the student model (i.e., the adaptive model 200) are the same type of model for purposes of distillation. One increasingly popular model is a sequence-to-sequence model known as a recurrent neural network transducer (RNN-T). A RNN-T does not employ an attention mechanism and, unlike other sequence-to-sequence models that generally need to process an entire sequence (e.g., audio waveform) to produce an output (e.g., a sentence), the RNN-T continuously processes input samples and streams output symbols, a feature that is particularly attractive for real-time communication. For instance, speech recognition with an RNN-T may output characters one-by-one as spoken. Here, an RNN-T uses a feedback loop that feeds symbols predicted by the model back into itself to predict the next symbols. Because decoding the RNN-T includes a beam search through a single neural network instead of a large decoder graph, an RNN-T may scale to a fraction of the size of a server-based speech recognition model. With the size reduction, the RNN-T may be deployed entirely on-device and able to run offline (i.e., without a network connection); therefore, avoiding unreliability issues with communication networks.

When the adaptive model 200 is an RNN-T model, the adaptive model 200 is a neural network model corresponding to an encoder-decoder framework that can be trained end-to-end to map input sequences (e.g., input audio signals) to target sequences (e.g., words or characters spoken in the audio signals). In other words, given an input sequence (e.g., of real-valued vectors), an RNN-T model tries to predict a target sequence of labels. Here, the input sequence may be raw feature vectors, such as log-mel filterbank energy features or other neural network encoded features.

With continued reference to FIG. 3, the adaptive model 200 includes an encoder network 302 and a decoder network 304. Here, the encoder network 302 includes an encoder 310 that reads a sequence of d-dimensional feature vectors $x=(x_1, x_2, \ldots, x_T)$, where $x_t \in \mathbb{R}^d$ and produces, at each time step, a higher-order feature representation also referred to as an encoder embedding e. The decoder network 304 receives the higher order feature representation e and uses a joint layer 320 and a prediction network 330 to decode the higher order feature representation e. The joint layer 320 in combination with the prediction network 330 may be considered a feed-forward neural network where the joint layer 320 computes logits that are fed into the prediction network 330. In other words, the joint layer 230 combines the higher order feature representation e, output by the encoder network 302, with an embedding of the previous prediction $y_{r-1}$, in order to produce a decoder output $y_r$. The decoder output can be a probability distribution, $P(y_i|y_{i-1}, \ldots, y_0, x)$, over the current sub-word unit, $y_i$, given the previous units, $\{y_{i-1}, \ldots, y_0\}$, and input, x. Although not illustrated, the decoder network 304 may include a Softmax layer that processes the output, $y_r$, from the decoder 304. The output of the Softmax layer is then used in a beam search process to select orthographic elements. The Softmax layer may be either integrated with or separate from the decoder network 304 depending on the configuration of the model 200.

Figure 4:
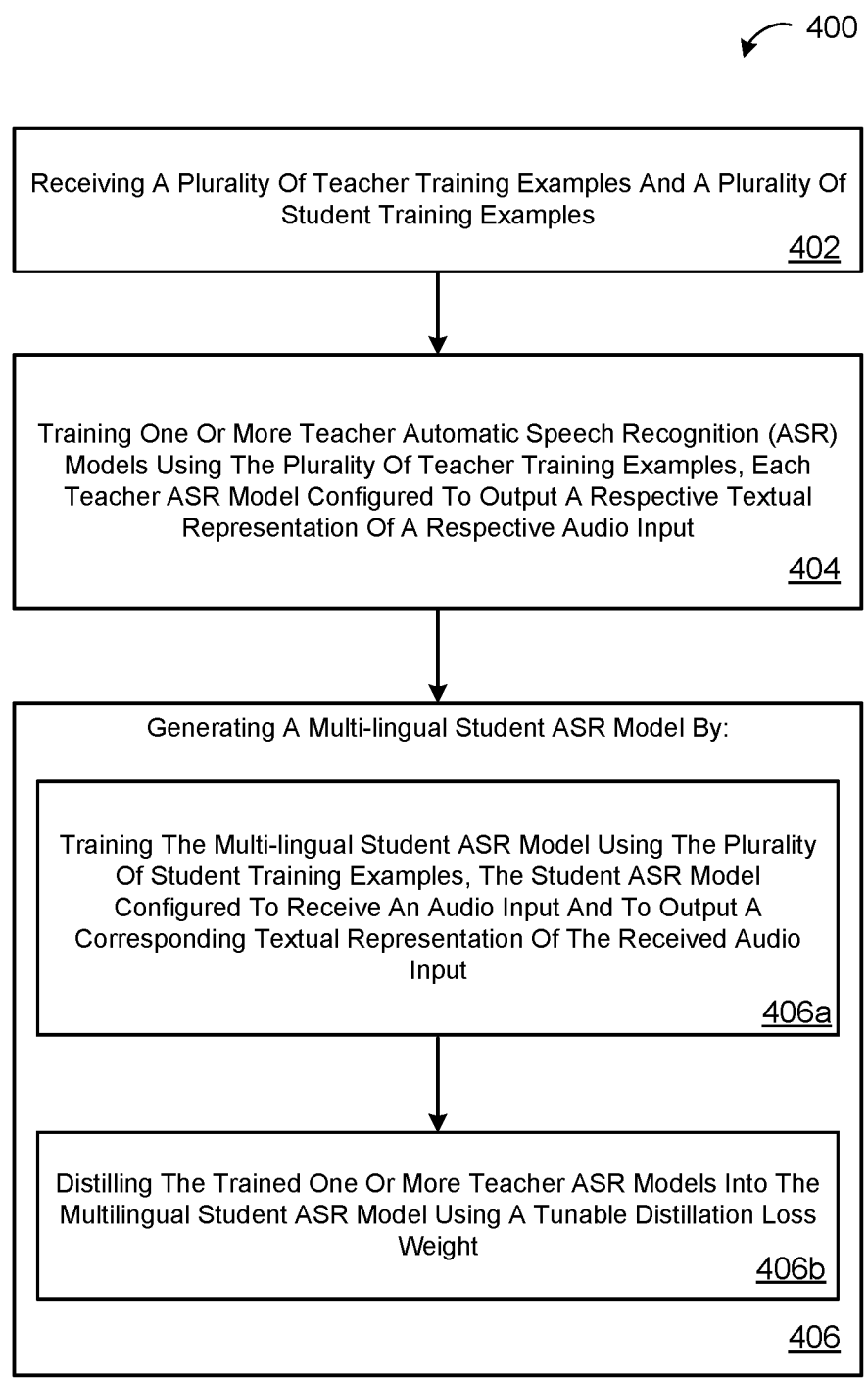
FIG. 4 is a flow chart of an example arrangement of operations for a method of generating the adaptive model.

FIG. 4 is a flowchart of an example arrangement of operations for a method 400 of distilling one or more trained teacher automatic speech recognition (ASR) models 210 into a multilingual student model 200. At operation 402, the method 400 includes receiving a plurality of teacher training examples and a plurality of student training examples.

At operation 404, the method 400 includes training one or more teacher ASR models 210 using the plurality of teacher training examples. Each teacher ASR model 210 is configured to output a respective textual representation of a respective audio input.

At operation 406, the method includes generating a multi-lingual student ASR model 200 by performing sub-operations 406a, 406b. Sub-operation 406a includes training the multi-lingual student ASR model 200 using the plurality of student training examples. The student ASR model 200 is configured to receive an audio input and to output a corresponding textual representation of the received audio input. Sub-operation 406b includes distilling the trained one or more teacher ASR models 210 into the multilingual student ASR model 200 using a tunable distillation loss weight.

Figure 5:
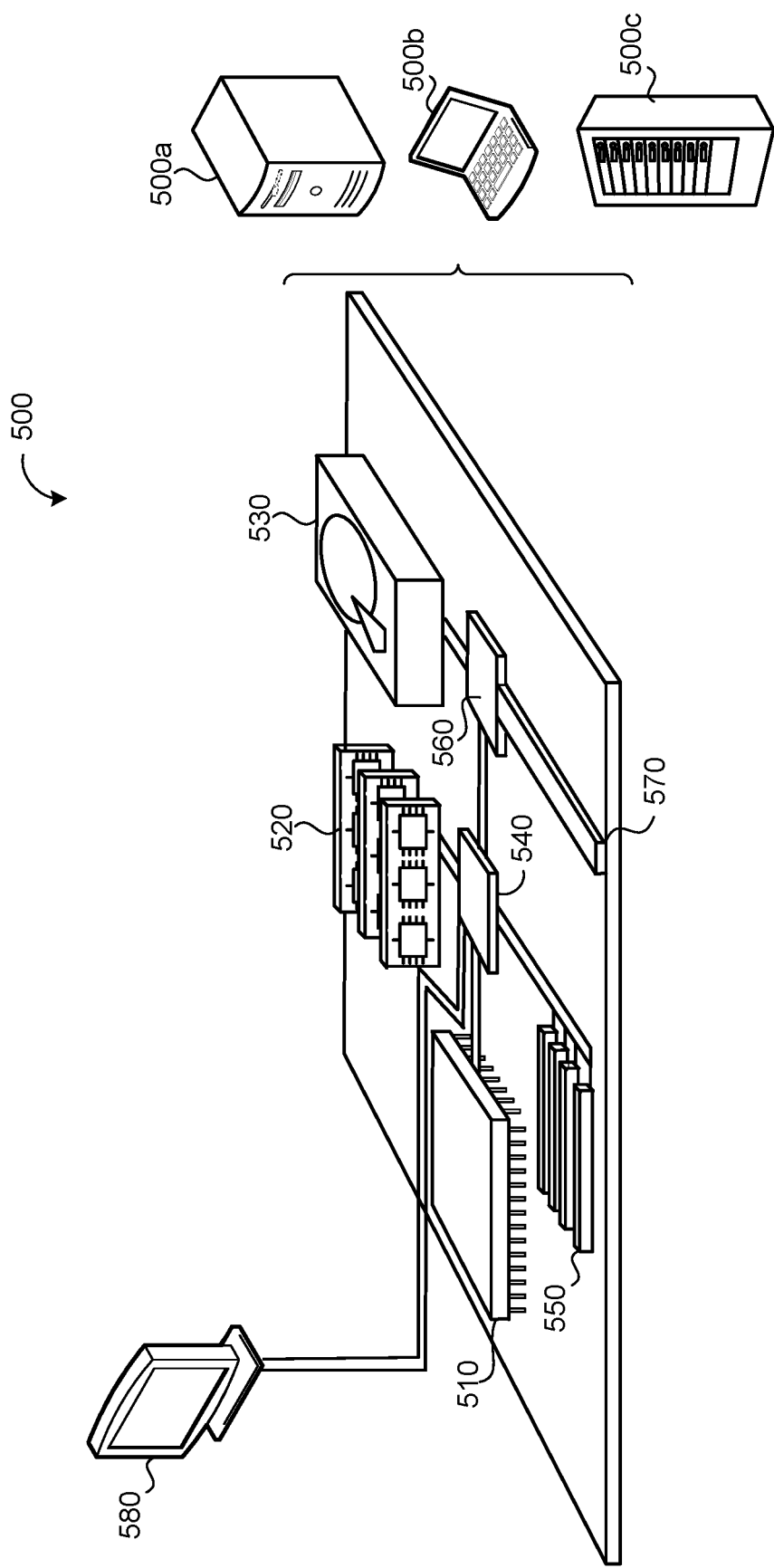
FIG. 5 is a schematic view of an example computing device that may be used to implement the systems and methods described herein.

FIG. 5 is schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510 (e.g., data processing hardware), memory 520 (e.g., memory hardware), a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500*a* or multiple times in a group of such servers 500*a*, as a laptop computer 500*b*, or as part of a rack server system 500*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed by data processing hardware causes the data processing hardware to perform operations comprising:
receiving a plurality of teacher training examples and a plurality of student training examples;
training one or more teacher automatic speech recognition (ASR) models using the plurality of teacher training examples, each teacher ASR model comprising a recurrent neural network-transducer (RNN-T) architecture and configured to output a respective textual representation of a respective audio input; and
generating a multi-lingual student ASR model comprising an RNN-T architecture by:
training the multi-lingual student ASR model using the plurality of student training examples, the student ASR model configured to receive an audio input and to output a corresponding textual representation of the received audio input; and
distilling the trained one or more teacher ASR models into the multi-lingual student ASR model by applying a tunable weight to a distillation loss of the multi-lingual student ASR model to generate a tunable distillation loss weight, the tunable distillation loss weight comprising a decreasing function based on a first RNN-T loss corresponding to the one or more teacher ASR models and a second RNN-T loss corresponding to the multi-lingual student ASR model.

2. The method of claim 1, wherein the one or more teacher ASR models are configured to collectively recognize fewer languages than the multi-lingual student ASR model.

3. The method of claim 1, wherein:
training the multi-lingual student ASR model occurs across n number of training steps; and
the tunable distillation loss weight comprises a decreasing function decreasing based on the n number of training steps.

4. The method of claim 1, wherein the decreasing function:
decreases the first RNN-T loss corresponding to the one or more teacher ASR models over an instance of time; and
increases the second RNN-T loss corresponding to the multi-lingual student ASR model over the instance of time.

5. The method of claim 1, wherein each teacher ASR model of the one or more teacher ASR models corresponds to a mono-lingual teacher ASR model.

6. The method of claim 1, wherein the one or more teacher ASR models corresponds to a single multi-lingual ASR model.

7. A system comprising:
data processing hardware; and
memory hardware in communication with the data processing hardware, the memory hardware storing instructions that when executed on the data processing hardware cause the data processing hardware to perform operations comprising:
receiving a plurality of teacher training examples and a plurality of student training examples;
training one or more teacher automatic speech recognition (ASR) models using the plurality of teacher training examples, each teacher ASR model comprising a recurrent neural network-transducer (RNN-T) architecture and configured to output a respective textual representation of a respective audio input; and
generating a multi-lingual student ASR model comprising an RNN-T architecture by:
training the multi-lingual student ASR model using the plurality of student training examples, the student ASR model configured to receive an audio input and to output a corresponding textual representation of the received audio input; and
distilling the trained one or more teacher ASR models into the multi-lingual student ASR model by applying a tunable weight to a distillation loss of the multi-lingual student ASR model to generate a tunable distillation loss weight, the tunable distillation loss weight comprising a decreasing function based on a first RNN-T loss corresponding to the one or more teacher ASR models and a second RNN-T loss corresponding to the multi-lingual student ASR model.

8. The system of claim 7, wherein the one or more teacher ASR models are configured to collectively recognize fewer languages than the multi-lingual student ASR model.

9. The system of claim 7, wherein:
training the multi-lingual student ASR model occurs across n number of training steps; and
the tunable distillation loss weight comprises a decreasing function decreasing based on the n number of training steps.

10. The system of claim 7, wherein the decreasing function:
decreases the first RNN-T loss corresponding to the one or more teacher ASR models over an instance of time; and
increases the second RNN-T loss corresponding to the multi-lingual student ASR model over the instance of time.

11. The system of claim 7, wherein each teacher ASR model of the one or more teacher ASR models corresponds to a mono-lingual teacher ASR model.

12. The system of claim 7, wherein the one or more teacher ASR models corresponds to a single multi-lingual ASR model.

* * * * *